United States Patent [19]

Dieudonne et al.

[11] 4,345,326

[45] Aug. 17, 1982

[54] SWITCHING NETWORK AND TELECOMMUNICATIONS CENTER COMPRISING SUCH A NETWORK

[75] Inventors: Marc P. G. Dieudonné; Yves G. Raillard, both of Colombes, France

[73] Assignee: Le Materiel Telephonique Thomson-CSF, Colombes, France

[21] Appl. No.: 158,358

[22] Filed: Jun. 11, 1980

[30] Foreign Application Priority Data

Jun. 12, 1979 [FR] France ................................ 79 14966

[51] Int. Cl.³ .......................................... H04Q 11/04
[52] U.S. Cl. ....................................... 370/60; 370/58; 179/18 GF
[58] Field of Search ................... 370/60, 58, 90, 94; 179/18 GF

[56] References Cited

U.S. PATENT DOCUMENTS

| | | | |
|---|---|---|---|
| 3,638,193 | 1/1972 | Opferman et al. | 179/18 GF |
| 3,674,938 | 7/1972 | Jacob | 370/58 |
| 4,251,879 | 2/1981 | Clark | 370/60 |

*Primary Examiner*—Douglas W. Olms
*Attorney, Agent, or Firm*—Roland Plottel

[57] ABSTRACT

When complete, the network D(p,k,a) comprises N operators each connected to p other operators of the network, p being an even integer. The N operators are located on h generatrices each comprising $(P/2)^k$ operators, h and k being any two numbers and h being equal to k+a. An operator of coordinates (i,j), i being the generatrix ($1 \leq i \leq h$) on which the operator is located and j being the operator order number ($1 \leq j \leq (P/2)^k$), is connected directly to P/2 operators Ax ($1 \leq x \leq P/2$) of the next generatrix, the coordinates of Ax being ((i+1) modulo h, x+P/2 (j−1) modulo $(P/2)^k$).

The invention applies to telecommunications centers.

6 Claims, 14 Drawing Figures

SWITCHING NETWORK AND TELECOMMUNICATIONS CENTER COMPRISING SUCH A NETWORK

The present invention relates to a switching network capable of processing any kind of digital data or data converted into digital form. This network can be used in telecommunication centres, especially telephone exchanges, i.e. the different switching assemblies or operators are installed in the same vicinity.

Switching network is the term given to an assembly of switching operators or "switch" and connections consisting of digital transmission channels, each channel interconnecting two operators and possessing two directions of communication.

The degree of an operator is defined as the number p of network operators to which it is directly connected by a link.

In known methods, such as that described in the French patent application issued under No. 2 366 754, only one type of data is generally switched, thereby implying only a single type of constraint.

In addition, since the number of independent paths between two operators is rather restricted, the failure of an operator may perturb the operation of all operators dependent on the former and it is necessary to provide safety arrangements in order to limit traffic disturbance, thereby complicating maintenance.

Finally, the extension of such networks requires considerable adaptation work with regard to both wiring and software.

The transmission of data packets is particularly appropriate for the switching network in accordance with the invention, capable of processing any type of digital data, since it possesses considerable flexibility with regard to the switched data. In order to process any kind of data (telephone, telex, digital data, etc.), it is necessary to meet the requirements of the most difficult type of transmission, which is that of telephone data requiring data transfer times in the exchange of the order of one millisecond.

In order to meet this temporal requirement, the architecture of the network described by the invention minimizes the "distance" covered by data in the exchange, "distance" being the number of operators traversed plus one.

In addition, the network in accordance with the present invention possesses a small number of operators than known networks for a total number V of channels to be switched and for the same nominal capacity m for each operator.

In addition, the network in accordance with the invention, interconnects operators in a manner ensuring total accessibility and excellent dependability, i.e. there is a larger number of possible independent paths between any two operators in the network.

Finally, an incomplete network in accordance with the present invention has the same properties as the complete network, the extension requiring no rewiring and with a sufficiently small extension increment to minimize the cost of the network as a function of traffic.

According to one characteristic of the invention, each operator in switching network $D(p,k,a)$ comprising N operators is connected by p links to p other operators of the network, p being an even integer, the N operators are distributed on h generatrices, each generatrix possesses $(p/2)^k$ operators, h and k being any two numbers and h being equal to $k+a$, and any operator having coordinates $(i,j)$, i being the generatrix ($1 \leq i \leq h$) on which the operator lies and j being the order number of the operator on the generatrix ($1 \leq j \leq (p/2)^k$), is connected by p/2 connections to p/2 operators Ax ($1 \leq x \leq p/2$) on the next generatrix, the coordinates of Ax being:

$$((i+1) \text{ modulo } h, [x+p/2(j-1)] \text{ modulo } (p/2)^k)$$

Figure 1:
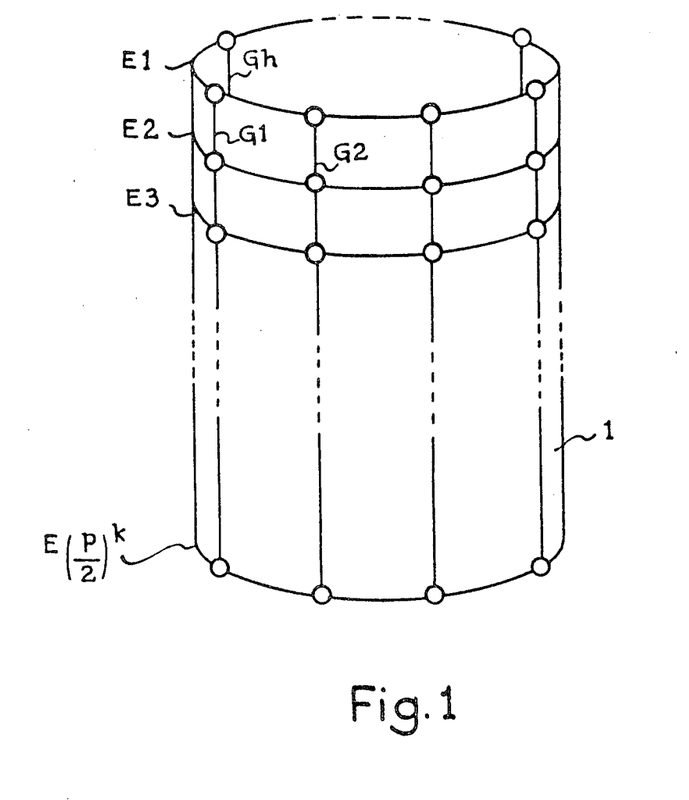
FIG. 1 schematically represents in space the arrangement of the operators of a switching network $D(p,k,a)$ in accordance with the invention.

Other characteristics of the present invention appear more clearly from the following description of an illustrative embodiment, this description referring to the appended drawings in which:

FIG. 1 illustrates three-dimensionally how the operators of a switching network in accordance with the present invention may be considered as located on the surface of a cylinder 1, since the wiring rules imply a certain degree of looping.

The operators are located firstly in line along h generatrices numbered 1 to h and designated by G1 to Gh in FIG. 1, and also on circles in $(p/2)^k$ levels numbered 1 to $(p/2)^k$, and designated E1 to $E(p/2)^k$ in FIG. 1, h and k being any integers.

The number of operators on a generatrix is therefore $(p/2)^k$, i.e. an exact power of the half-degree (p/2) of an operator, which ensures a periodical and regular scrambling law.

The total number N of operators in the network is equal to $(p/2)^k \cdot h$, and substituting $h=k+a$, the network is defined by the three parameters p, k and a is designated $D(p,k,a)$.

The rules for wiring the operators on a generatrix Gi to those on the next generatrix $G(i+1)$ is the same, independent of the value of i, this value lying between 1 and h, and $h+1$ equal to 1, corresponding to completion of the full circle in the network.

The wiring rules are defined as follows: any operator of coordinates $(i,j)$, i being the number of the generatrix ($1 \leq i \leq h$) on which it is located and j being the operator order number on the generatrix, i.e. the level number ($1 \leq j \leq (p/2)^k$), is connected by p/2 links to p/2 operators Ax ($1 \leq x \leq p/2$) of the next generatrix, the coordinates of Ax being:

$((i+1) \bmod h, [x+p/2(j-1)] \bmod (p/2)^k$.

Figure 2A:
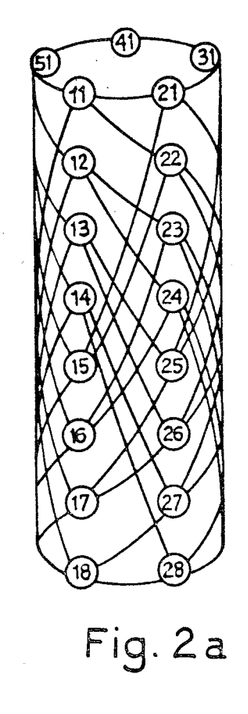
FIG. 2a represents in space an example of a switching network in accordance with the invention for which p is equal to 4, k is equal to 3 and a is equal to 2, designated by $D(4,3,2)$.
Figure 2B:
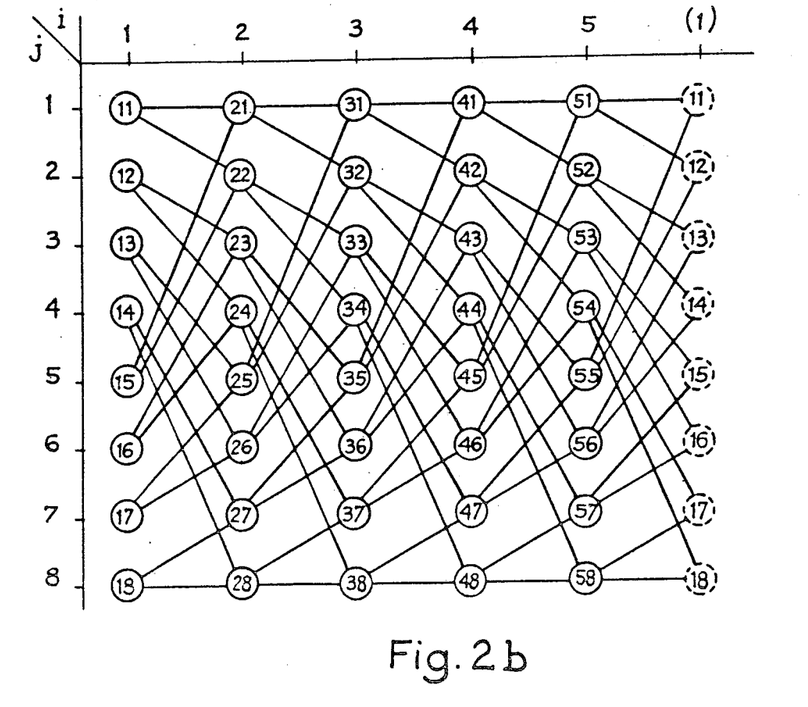
FIG. 2b represents the same network $D(4,3,2)$ as in FIG. 2a, but shown in two-dimensional form.

FIGS. 2a and 2b illustrate the same network D(p,k,a) for which p is equal to 4, k is equal to 3 and a is equal to 2.

In FIG. 2a, network D(4,3,2) is represented spatially in the manner seen in FIG. 1. The wiring in accordance with the rules mentioned above is represented.

In this particular case, the wiring rules become: one operator of coordinates (i,j) for which $1 \leq i \leq 5$ and $1 \leq j \leq 8$ is connected to two operators lying on the next generatrix: A1 of coordinates ((i+1) modulo 5, [1+2(j−1)] modulo 8) and A2 of coordinates ((i+1) modulo 5, (2j) modulo 8).

This wiring is described in detail, referring to FIG. 2b.

Network D(4,3,2) possesses 5 generatrices on each of which lie eight operators, making a total of forty operators.

Since the first generatrix follows the fifth with regard to wiring, it is shown a second time by means of dashed lines following the fifth, in order to obtain a two-dimensional development. An operator of coordinates (i,j) is identified by ij in FIG. 2b.

Each operator is connected by two connections to two operators on the previous generatrix and to two operators on the next generatrix.

Since the wiring rules are the same between any successive pair of generatrices, it is merely necessary to describe accurately the connections between the first and second generatrices, applying the formulae determining the coordinates of A1 and A2 as a function of i and j.

Operator 11 is connected to operators 21 and 22.
Operator 12 is connected to operators 23 and 24.
Operator 13 is connected to operators 25 and 26.
Operator 14 is connected to operators 27 and 28.
Operator 15 is connected to operators 21 and 22.
Operator 16 is connected to operators 23 and 24.
Operator 17 is connected to operators 25 and 26.
Operator 18 is connected to operators 27 and 28.

A network D(p,k,a) in accordance with the present invention may be the subject of various applications, depending on the nature of the operators used.

A first type of application consists in using identical operators, each comprising a switching level connected to the other operators of the network, an interface to the outside of the network and a higher level constituted by a control microprocessor at the switching and interface level.

Since all these operators are the same and are connected to the outside, they all have the same hierarchical level and the network has been given a distributed structure.

Figure 3:
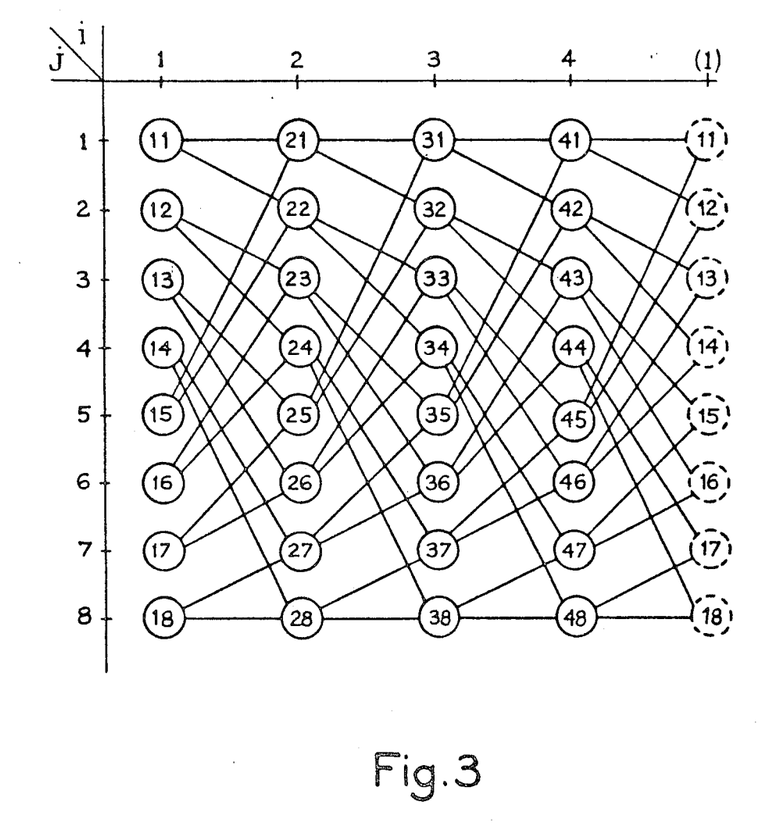
FIG. 3 is an example of a complete type $D(p,k,1)$ network in accordance with the invention, designated by $R(p,k)$, in which p is equal to 4 and k is equal to 3, and of distributed structure.

FIG. 3 represents a network D(p,k,1), designated R(p,k), in accordance with the present invention, for which k is equal to 3 and p is equal to 4, and of distributed structure.

This network comprises four generatrices and eight nodal points per generatrix. It therefore comprises thirty-two operators.

Since the first generatrix follows the fourth with regard to connections, it has been shown a second time by dashed lines in order to clarify the figure. The nodal points of the first generatrix are identified 11 to 18, those of the second 21 to 28, those of the third 31 to 38 and those of the fourth 41 to 48.

Each nodal point is connected by two connections to two nodal points of the previous generatrix and by two other connections to two nodal points of the next generatrix.

The connections to the next generatrix are established in the following manner: the $j^{th}$ terminal (j=1,2) of the $i^{th}$ nodal point (i=1 to 8) is connected to the $[(j+2(i-1)) \bmod 8]^{th}$ nodal point of the next generatrix.

The first terminal (j=1) of the first nodal point (i=1) of each generatrix is thus connected to the first nodal point of the next generatrix, and the second terminal (j=2) of the first nodal point (i=1) of each generatrix is connected to the second nodal point of the next generatrix. Nodal point 11 is thus connected to nodal points 21 and 22.

The first terminal (j=1) of the second nodal point (i=2) of each generatrix is connected to the third nodal point of the next generatrix, and the second terminal (j=2) of the second nodal point (i=2) of each generatrix is connected to the fourth nodal point of the next generatrix. Nodal point 12 is thus connected to nodal points 23 and 24.

The first terminal (j=1) of the third nodal point (i=3) of each generatrix is connected to the fifth nodal point of the next generatrix, and the second terminal (j=2) of the third nodal point (i=3) of each generatrix is connected to the sixth nodal point of the next generatrix. Nodal point 13 is thus connected to nodal points 25 and 26.

The first terminal (j=1) of the fourth nodal point (i=4) of each generatrix is connected to the seventh nodal point of the next generatrix, and the second terminal (j=2) of the fourth nodal point (i=4) of each generatrix is connected to the eighth nodal point of the next generatrix. Nodal point 14 is thus connected to nodal points 27 and 28.

The first terminal (j=1) of the fifth nodal point (i=5) of each generatrix is connected to the first nodal point of the next generatrix, and the second terminal (j=2) of the fifth nodal point (i=5) of each generatrix is connected to the second nodal point of the next generatrix. Nodal point 15 is thus connected to nodal points 21 and 22.

The first terminal (j=1) of the sixth nodal point (i=6) of each generatrix is connected to the third nodal point of the next generatrix, and the second terminal (j=2) of the sixth nodal point (i=6) of each generatrix is connected to the fourth nodal point of the next generatrix. Nodal point 16 is thus connected to nodal points 23 and 24.

The first terminal (j=1) of the seventh nodal point (i=7) of each generatrix is connected to the fifth nodal point of the next generatrix, and the second terminal (j=2) of the seventh nodal point (i=7) of each generatrix is connected to the sixth nodal point of the next generatrix. Nodal point 17 is thus connected to nodal points 25 and 26.

The first terminal (j=1) of the eighth and last nodal point (i=8) of each generatrix is connected to the seventh nodal point of the next generatrix, and the second terminal (j=2) of the eighth and last (i=8) nodal point of each generatrix is connected to the eighth nodal point of the next generatrix. Nodal point 18 is thus connected to nodal points 27 and 28.

Having described an example R(4,3) of network R(p,k) in accordance with the present invention, the properties of these networks are now described.

Firstly, all the nodal points on the same generatrix have the same role, and all the levels also have the same role, with the result that any nodal point has the same role as any other nodal point.

This property of networks R(p,k) implies, amongst other features, that the maximum distance TM and average distance Tm between any two operators of the network (a distance being equal to the number of operators traversed plus one) may be calculated simply by evaluating the distances of a given nodal point to the other nodal points, which requires N−1 evaluations, where N is the total number of operators equal to $(k+1)(p/2)^k$, whilst in the case of any network, this calculation requires $C_N^2$ evaluations.

In a network in accordance with the present invention, the maximum distance TM is 3, if k is 2, and is equal to $2k = E(k/2+1)$ if k exceeds 2, $E(k/2+1)$ being the whole-number part of $(k/2+1)$.

Table I gives examples of R(p,k) networks in accordance with the present invention, depending on the maximum distances TM and the mean distances Tm.

It is important in switching networks to minimize the maximum distance TM, since the maximum transit time of the network depends on this maximum distance.

In the case of self-directing data packet transmission, the lengths of the headers identifying the different operators to be traversed also depends on this maximum distance TM.

The mean distance Tm should also be minimized, since the overall switching capacity of the operators depends directly on this mean distance. If the incident data rate is A Mbit/s, the total data rate for all the paths of the network is A.Tm.

In networks R(p,k) in accordance with the present invention, distances Tm and TM are close to their theoretical minima. For any regular pattern of N nodal points in which each nodal point is connected directly to p nodal points, the theoretical minimum of TM is that which can be derived from the following formula:

$$N = \frac{p(p-1)^{TM} - 2}{p-2}$$

The fact that the role of any nodal point is the same as that of any other nodal point also implies simplification of the path search and distribution algorithms, as well as highly regular wiring which may even be of a simple repetitive nature.

Figure 4:
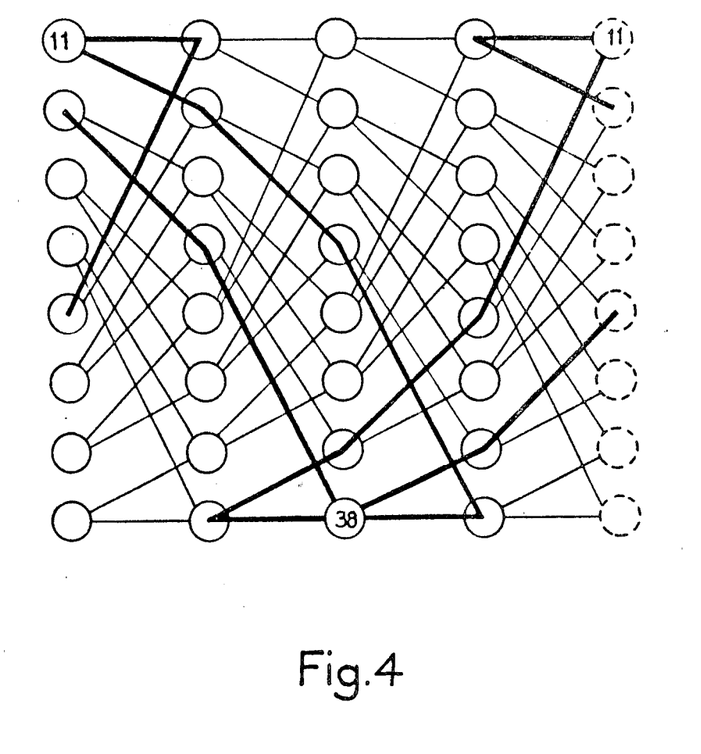
FIG. 4 shows four independent paths between the first operator and the first generatrix and the eighth operator of the third generatrix in the network illustrated in FIG. 1.

Another property of these networks R(p,k) is to ensure the highest possible dependability, since for any pair of operators, it is always possible to determine p independent paths with regard to borrowed connections and nodal points, i.e. each connection and each nodal point are used once at the most. FIG. 4 shows four independent paths between nodal point 11 and nodal point 38 in the network R(4,3). These four paths are:

11-21-15-47-38
11-22-34-48-38
11-41-12-24-38
11-45-37-28-38

TABLE I

| p | | n=2 | n=3 | n=4 | n=5 | n=6 | n=7 | n=8 | n=9 | |
|---|---|---|---|---|---|---|---|---|---|---|
| 4 | | 12 | 32 | 80 | 192 | 448 | 1024 | 2304 | 5120 | N |
|   | | 3 | 4 | 5 | 7 | 8 | 10 | 11 | 13 | $T_M$ |
|   | | 1.83 | 2.6 | 3.45 | 5.23 | 7 | 8.25 | 9.44 | 10.7 | $T_m$ |
| 6 | | 27 | 108 | 405 | 1 458 | 5 103 | 17 496 | 59 049 | 196 830 | N |
|   | | 3 | 4 | 5 | 7 | 8 | 10 | 11 | 13 | $T_M$ |
|   | | 2 | 3.06 | 4.18 |   | 7 | 8.25 | 9.44 | 10.7 | $T_m$ |
| 8 | | 48 | 256 | 1 280 | 6 144 | 28 672 | 131 072 | 589 824 | 2.6.10⁶ | N |
|   | | 3 | 4 | 5 | 7 | 8 | 10 | 11 | 13 | $T_M$ |
|   | | 2.08 | 3.25 | 4.28 |   | 7 | 8.25 | 9.44 | 10.7 | $T_m$ |
|    | | 75 | 500 | 3 125 |   |   |   |   |   | N |
|    | | 3 | 4 | 5 |   |   |   |   |   | $T_M$ |
|    | |   |   |   |   |   |   |   |   | $T_m$ |
| 12 | | 108 | 864 | 6 480 |   |   |   |   |   | N |
|    | | 3 | 4 | 5 |   |   |   |   |   | $T_M$ |
|    | |   |   |   |   |   |   |   |   | $T_m$ |
| 16 | | 192 | 2 048 | 20 480 |   |   |   |   |   | N |
|    | | 3 | 4 | 5 |   |   |   |   |   | $T_M$ |
|    | |   |   |   |   |   |   |   |   | $T_m$ |

Moreover, in the event of failure of an operator resulting in its being taken out of service, the maximum distance TM between any pair of operators still in service is increased by only one for networks in which k is odd, and by two for networks in which k is even.

Finally, taking an operator out of service has very little effect on the mean distance Tm and consequently on the total traffic carried.

Another property of the network R(p,k) resides in the methods of extension. One of these, particularly advantageous, is described below.

Figure 5A:
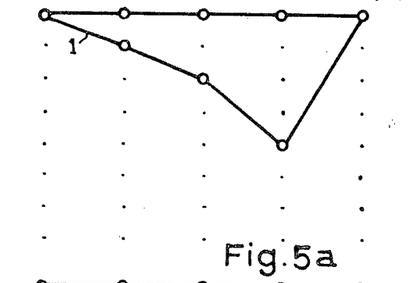
FIGS. 5a to 5h illustrate the method of extending the network $R(4,3)$ from the initial module (FIG. 3a) to the complete network (FIG. 3h)

Any network R(p,k) may be constructed from an initial module of $(p/2k)+1$ nodal points connected in a closed system. In the case of the network R(4,3), FIG. 5a represents an initial module 1 of seven nodal points connected in a closed loop and using the connections shown in FIG. 1, which constitutes the following loop:

11-21-31-41-11-45-33-22-11

Later, the network is extended by the successive addition of similar loops which are connected to at least p/2 nodal points of the network in the course of construction.

Figure 5B:
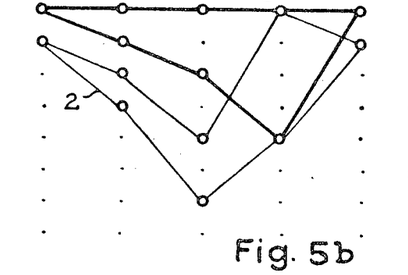

FIG. 5b shows a first extension for the network R(4,3). A second module 2 of seven nodal points is connected to nodal points 41 and 45 of the initial module 1 and constitutes the following loop:

12-23-35-41-12-45-37-24-12

Figure 5C:
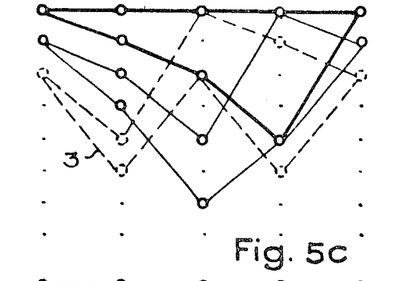

FIG. 5c shows a second extension. A third module 3 of seven nodal points is connected to nodal points 31 and 33 and constitutes the following loop:

13-25-31-42-13-46-32-26-13

Figure 5D:
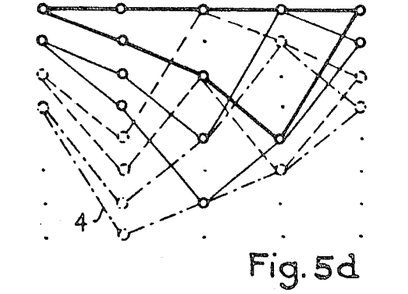

FIG. 5d shows a third extension. A fourth module 4 of seven nodal points is connected to nodal points 35, 37, 42 and 46 and constitutes the following loop:

14-27-35-42-14-46-37-28-14

Figure 5E:
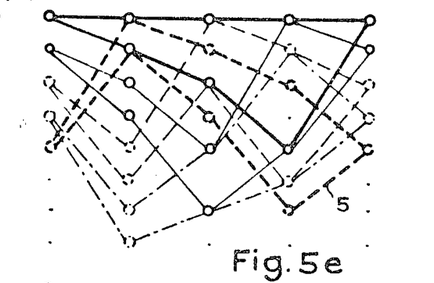

FIG. 5e shows a fourth extension. A fifth module 5 of seven nodal points is connected to nodal points 21 and 22 and constitutes the following loop:

15-21-32-43-15-47-34-22-15

Figure 5F:
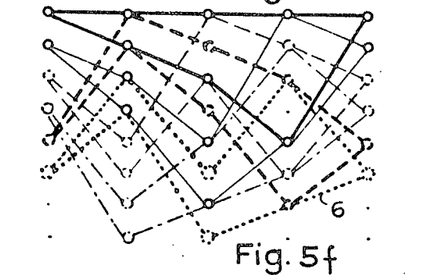

FIG. 5f shows a fifth extension. A sixth module 6 of seven nodal points is connected to nodal points 23, 24, 43 and 47 and constitutes the following loop:

16-23-36-43-16-47-38-24-16

Figure 5G:
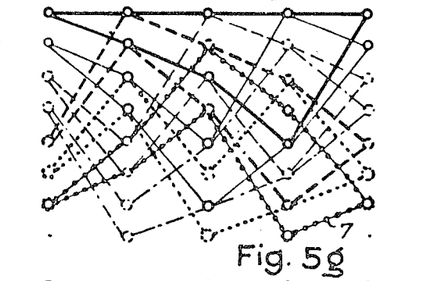

FIG. 5g shows a sixth extension. A seventh module 7 of seven nodal points is connected to nodal points 25, 26, 32 and 34 and constitutes the following loop:

17-25-32-44-17-48-34-26-17

Figure 5H:
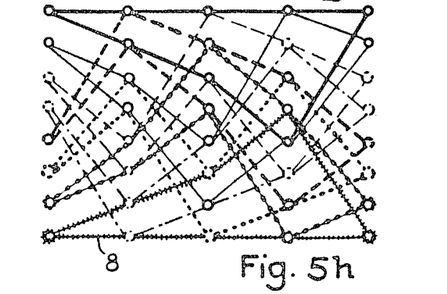

FIG. 5h shows a seventh extension, which is the last extension and which produces a complete network R(3,4), as shown in FIG. 1. An eighth module 8 of seven nodal points is connected to nodal points 27, 28, 36, 38, 44 and 48 and constitutes the following loop:

18-27-36-44-18-48-38-28-18

This extension method has many advantages. One of the advantages is that for each extension stage, the maximum distance TM is equal to that of the complete network, which means that the traffic which can be carried by an incomplete network is proportional to the number of modules installed.

Another advantage is the ease of wiring, since each extension involves new cables but no rewiring, i.e. once a connection has been made, it is never modified.

A third advantage of this extension method is its optimum dependability, i.e. at each extension any pair of operators may be connected by a number of independent paths (with regard to borrowed connections) equal to at least the number of connections of the two operators considered.

Finally, a fourth advantage is a reasonably small extension increment with respect to the total number of operators and a large number $(p/2)^k - 1$ of possible extensions. For example, in the case of network R(8,4) comprising 1280 operators (see Table I), the minimum extension is 17 operators, i.e. 1.3% of the number of operators in the complete network, and there are 255 possible extensions from the initial module to the complete network.

The network R(p,k) in accordance with the present invention thus has many advantages with regard to routing as well as extension and maintenance.

A second possible application consists in using two types of operator.

A first type of operator known as a "terminal" operator is used on one generatrix, such as $G(i_0)$, i.e. for operators of coordinates $(i_0, j)$, where $i_0$ is a particular value of i between 1 and h. These terminal operators comprise a switching level connected to the other operators of the network, an interface with the outside of the network and an upper level constituted by a microprocessor controlling the switching level and the interface to the outside.

A second type of operator, known as an "internal transit" operator, is used on the (h−1) other generatrices.

These internal transit operators have only one switching level connected to the other operators of the network and one higher level constituted by a microprocessor controlling the switching level, this higher level possessing "intelligence" and memory capacity considerably less than those of the higher level of a terminal operator.

Operators of the second type do not comprise direct connections to outside of the network, with the result that hierarchical level differences have been introduced and the network is given a hierarchized structure.

The size of a network is determined by the maximum volume V of transmission channels it is required to switch. A network in accordance with the present invention requires $N1 = V/m$ operators of the first type and $N2 = (V/m)[\log_{p/2}(V/m) - 1]$ operators of the second type.

Figure 6:
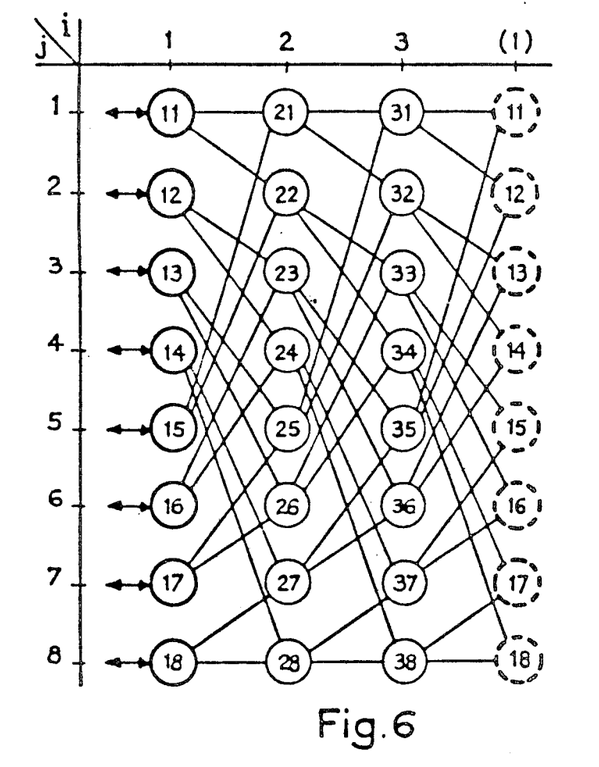
FIG. 6 represents an example of a complete type $D(p,k,0)$ in accordance with the invention, designated by $G(p,k)$, in which p is equal to 4 and k is equal to 3, and of hierarchized structure.

In the example to be described which is shown in FIG. 6, each operator is connected directly to 4 other operators of the network, i.e. p is equal to 4. In addition it is assumed that V/m is 8, which gives N1 equal to 8 and N2 equal to 16.

This network G(4,3) possesses 3 generatrices: ($k = \log_{p/2} V/m = \log_2 8 = 3$) and 8 operators per generatrix. It is therefore a network D(p,k,0).

The first generatrix ($i_0 = 1$) comprises terminal operators indicated by heavy circles and heavy lines with double arrows indicating connections to the outside of the network, and which are numbered 11 to 18.

The two remaining generatrices are occupied by internal transit operators represented by light circles numbered 21 to 28 for the first and 31 to 38 for the second.

Since the first generatrix follows the third with regard to connections, it it shown a second time by dashed lines in order to clarify the figure. The connections are made in accordance with the general description of a network D(p,k,a) and an operator of coordinates (i,j) has the number ij in the figures.

Operator (1,1) is thus connected to operators (2,1) and (2,2) of the next generatrix and to operators (3,1) and (3,5) of the previous generatrix.

Operator (1,2) is connected to operators (2,3), (2,4), (3,1) and (3,5).

Operator (1,3) is connected to operators (2,5), (2,6), (3,2) and (3,6).

Operator (1,4) is connected to operators (2,7), (2,8), (3,2) and (3,6).

Operator (1,5) is connected to operators (2,1), (2,2), (3,3) and (3,7).

Operator (1,6) is connected to operators (2,3), (2,4), (3,3) and (3,7).

Operator (1,7) is connected to operators (2,5), (2,6), (3,4) and (3,8).

Operator (1,8) is connected to operators (2,7), (2,8), (3,4) and (3,8).

In order to obtain all the connections, it is merely necessary to make the connections between the second and third generatrices.

Operator (2,1) is connected to operators (3,1) and (3,2).

Operator (2,2) is connected to operators (3,3) and (3,4).

Operator (2,3) is connected to operators (3,5) and (3,6).

Operator (2,4) is connected to operators (3,7) and (3,8).

Operator (2,5) is connected to operators (3,1) and (3,2).

Operator (2,6) is connected to operators (3,3) and (3,4).

Operator (2,7) is connected to operators (3,5) and (3,6).

Operator (2,8) is connected to operators (3,7) and (3,8).

What is claimed is:

1. A switching network comprising N switching units, each switching unit being connected directly by p bilateral connections to other switching units of the network, p being an even integer greater than 2, wherein the switching units may be considered as located on h generatrices G1 to Gh, h being any integer, wherein each generatrix comprises $(p/2)^k$ switching units, numbered 1 to $(p/2)^k$, k being any integer, and wherein any switching unit of coordinates (i,j), i being the generatrix ($1 \leq i \leq h$) on which the switching unit is located and j being the switching unit order number on the generatrix ($1 \leq j \leq (p/2)^k$), is connected by p/2 connections to p/2 Ax-switching units ($1 \leq x \leq p/2$) on the next generatrix, the coordinates of the Ax-switching units being: ((i+1) modulo h, {x+p/2(j−1)} modulo $(p/2)^k$).

2. A switching network in accordance with claim 1, wherein all the switching units are identical and each possesses an interface to the outside of the network, a switching level connected to p other switching units of the network and a higher level constituted by a unit controlling the switching level and the interface towards the outside.

3. A switching network for a telecommunications centre in accordance with claim 2, having a distributed structure and in which h is equal to k+1, wherein it is constructed from an initial module (1) of (p/2.k)+1 nodal points connected in a closed loop by the connections defined in claim 1.

4. A switching network for a telecommunications centre constructed from an initial module (1) in accordance with claim 3, extended by the addition of extension modules, wherein an extension module (2, 3, 4, 5, 6, 7 or 8) comprises (p/2.k)+1 nodal points, of which at least p/2 belong to the already existing network and which are connected in a closed loop by the connections defined in claim 1.

5. A switching network in accordance with claim 1, wherein the switching units of coordinates ($i_0$,j), $i_0$ being a particular value of i between 1 and h and where $1 \leq j \leq (p/2)^k$, are of a first type and comprise an interface to the outside of the network, a switching level connected to p other switching units of the network and a higher level constituted by a microprocessor controlling the switching level and the interface towards the outside, and wherein the switching units of coordinates (i,j), i being different from $i_0$, with $1 \leq i \leq h$ and $1 \leq j \leq (p/2)^k$, are of a second type possessing no interface towards the outside of the network, but comprising a switching level connected to p other switching units of the network and an upper level constituted by a microprocessor controlling the switching level.

6. A telecommunications centre comprising a switching network in accordance with any of claims 1 to 5.

* * * * *